United States Patent
Lewis

(10) Patent No.: US 12,450,370 B2
(45) Date of Patent: Oct. 21, 2025

(54) DETAILED COMPROMISED USER CREDENTIAL THEFT WITH ARTIFICIAL ACCOUNTS

(71) Applicant: Truist Bank, Charlotte, NC (US)

(72) Inventor: Michael Brantley Lewis, Nashville, NC (US)

(73) Assignee: Truist Bank, Charlotte, NC (US)

( * ) Notice: Subject to any disclaimer, the term of this patent is extended or adjusted under 35 U.S.C. 154(b) by 333 days.

(21) Appl. No.: 18/331,592

(22) Filed: Jun. 8, 2023

(65) Prior Publication Data

US 2024/0411904 A1    Dec. 12, 2024

(51) Int. Cl.
  *G06F 21/60*    (2013.01)
  *G06F 21/62*    (2013.01)

(52) U.S. Cl.
  CPC ........ *G06F 21/604* (2013.01); *G06F 21/6218* (2013.01)

(58) Field of Classification Search
  CPC .......................... G06F 21/604; G06F 21/6218
  See application file for complete search history.

(56) References Cited

U.S. PATENT DOCUMENTS

| | | | | |
|---|---|---|---|---|
| 9,424,413 B2* | 8/2016 | Hammad | ............ | H04L 63/0428 |
| 9,917,858 B2* | 3/2018 | Hathaway | ................ | H04L 67/02 |
| 10,102,544 B2* | 10/2018 | Merriman | ........... | G06Q 30/0255 |
| 10,158,659 B1* | 12/2018 | Huang | .................... | H04W 4/21 |
| 10,333,964 B1* | 6/2019 | Freeman | ............. | H04L 63/1425 |
| 10,382,469 B2* | 8/2019 | Adams | ................ | H04L 63/1433 |
| 10,601,868 B2* | 3/2020 | Wilcox | ............... | H04L 63/1483 |
| 11,757,914 B1* | 9/2023 | Jakobsson | ............... | H04L 51/42 726/25 |
| 2015/0310201 A1* | 10/2015 | Sugiyama | ............. | G06F 21/552 726/7 |
| 2020/0059489 A1* | 2/2020 | Johnson | ................... | H04L 63/08 |
| 2020/0067861 A1* | 2/2020 | Leddy | ................. | G06F 21/6245 |
| 2020/0153836 A1* | 5/2020 | Johnson | ............. | G06Q 30/0185 |
| 2021/0089657 A1* | 3/2021 | Dunjic | ..................... | G06F 21/52 |
| 2021/0089658 A1* | 3/2021 | Dunjic | ................ | G06F 11/3688 |
| 2022/0138753 A1* | 5/2022 | Wright | ............... | G06Q 20/4016 705/44 |
| 2022/0360596 A1* | 11/2022 | Varnavas | ............ | H04L 63/1416 |
| 2022/0391927 A1* | 12/2022 | Jain | ..................... | H04L 63/1441 |
| 2023/0171085 A1* | 6/2023 | Lee | ......................... | H04L 9/008 380/28 |
| 2024/0007500 A1* | 1/2024 | Endler | ................ | H04L 63/1466 |
| 2024/0250988 A1* | 7/2024 | Chapman | ............ | H04L 63/1491 |
| 2024/0411904 A1* | 12/2024 | Lewis | ................ | G06F 21/6218 |

* cited by examiner

*Primary Examiner* — Gary S Gracia
(74) *Attorney, Agent, or Firm* — Kilpatrick Townsend & Stockton LLP; Michael A. Springs, Esq.

(57) ABSTRACT

A system can be used to detect compromised user credential theft via artificial accounts. The system can receive an indication of a compromised user account. The system may generate an artificial user account based on the compromised user account. The system can detect a login to the artificial user account and receive information about one or more actions performed while logged into the artificial user account. Subsequently, the system may generate a profile associated with the artificial user account using the information about the one or more actions performed while logged into the artificial user account and use the profile to prevent a subsequent access to a user account of a plurality of user accounts by a user with a matching profile to the profile.

20 Claims, 5 Drawing Sheets

DETAILED COMPROMISED USER CREDENTIAL THEFT WITH ARTIFICIAL ACCOUNTS

TECHNICAL FIELD

The present disclosure relates generally to cybersecurity and, more particularly (although not necessarily exclusively), to detecting and preventing fraud using techniques for detecting theft of user credentials.

BACKGROUND

A threat vector in cybersecurity stems from the abuse of illicitly obtained compromised user credentials. For example, in a credential stuffing attack, compromised user credentials may be used to attempt to authenticate to a large number of network resources with the expectation that the compromised credentials have been reused in at least some places. Security engineers have an interest in preventing fraudulent logins through credential stuffing attacks and other exploits involving compromised user credentials. Security engineers may thus monitor authentication systems for attempted attacks involving known compromised user credentials. But, distinguishing an attack from a legitimate unsuccessful login (e.g., a login attempt using an old password, or an incorrect password typed in by a legitimate user) may not be possible. Likewise, distinguishing a successful attack from a successful login may be similarly difficult to discern using information available from authentication systems.

SUMMARY

In one example, a system includes one or more processors and one or more computer-readable storage media for storing instructions that are executable by the one or more processors to cause the system to perform certain operations. The system receives an indication of a compromised user account. The system can generate an artificial user account based on the compromised user account. The system can then detect a login to the artificial user account and receive information about one or more actions performed while logged into the artificial user account. The system may generate a profile associated with the artificial user account using the information about the one or more actions performed while logged into the artificial user account. The system may then use the profile to prevent a subsequent access to a user account that is associated with an identified profile that matches the profile.

In another example, a method involves a computing device receiving an indication of a compromised user account. The computing device may generate an artificial user account based on the compromised user account and then later detect a login to the artificial user account. The computing device may receive information about one or more actions performed while logged into the artificial user account and generate a profile associated with the artificial user account using the information about the one or more actions. The computing device may then use the profile to prevent a subsequent access to a user account that is associated with an identified profile that matches the profile.

In another example, a non-transitory computer-readable medium stores instructions that, when executed by one or more processors, can cause the one or more processors to perform operations including receiving an indication of a compromised user account. The one or more processors may receive instructions to generate an artificial user account based on the compromised user account and detect a login to the artificial user account. The one or more processors can receive instructions to receive information about one or more actions performed while logged into the artificial user account. The one or more processors may receive instructions to generate a profile associated with the artificial user account using the information about the one or more actions performed while logged into the artificial user account. The one or more processors may receive instructions to then use the profile to prevent a subsequent access to a user account that is associated with an identified profile that matches the profile.

DETAILED DESCRIPTION

Figure 1:
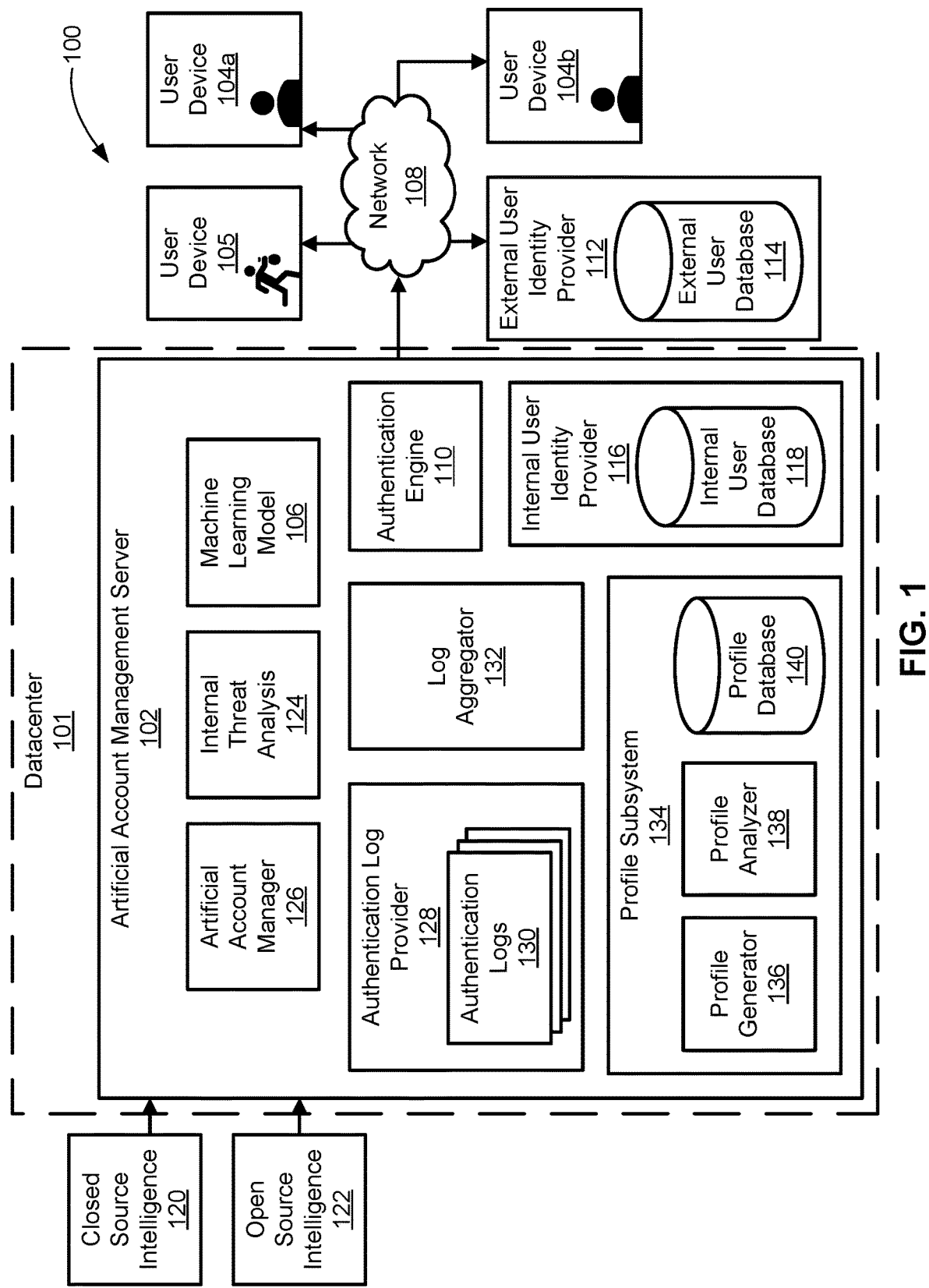
FIG. 1 is a schematic of an example of a system for detecting and preventing fraud using techniques for compromised user credential theft detection via artificial accounts, according to one aspect of the present disclosure.

Certain aspects and examples of the present disclosure relate to detecting and preventing fraud using techniques for compromised user credential theft detection via artificial accounts. One approach to mitigating the effects of user credential theft involves artificial accounts. An artificial account can be a user account created to mimic the behavior of a legitimate user account from the perspective of an attacker attempting to login using illicitly obtained compromised credentials. The artificial account may lack some or all of the functionality of a legitimate user account. The artificial account can thus be used as decoy. Detected logins to the artificial user account can monitored without the knowledge of the attacker. The information learned from monitoring can be used to build a profile on the attacker, which can be used to prevent subsequent fraudulent logins and minimize damages related to the fraud by monitoring for suspicious logins with similar profiles.

User credential theft, or fraud, in the context of cybersecurity, may refer to any intentional deception or misrepresentation of information with the aim of gaining unauthorized access to computer systems, stealing sensitive data, or using computer resources for illegitimate purposes, often for financial gain. For example, attempting to login to a banking website using an illicitly obtained username and password is an example of cybersecurity fraud. Such illicitly obtained credentials may be referred to as compromised user credentials. For example, if a data breach occurs at a business hosting a user database including usernames and passwords, the stolen user database may be made available for purchase on the dark web or other black markets. The breached usernames and passwords are considered compromised.

A challenge in networked environments can be from fraudulent logins using compromised user credentials. Some of the techniques of the present disclosure can allow for an organization that services client authorization and authentication requests to detect fraudulent login attempts and to determine further user credential exposures. In some examples, known compromised user credentials may be used to generate active artificial accounts using those compromised credentials. Login attempts to the generated artificial user accounts may be fraudulent in most cases since the credentials are known to be compromised. Once a login to an artificial user account is detected, the actions performed while logged into the artificial user account can be used to generate a profile. The generated profile can be used to detect subsequent logins that may have a matching profile. For example, matching profiles may be determined using techniques like link analysis. Link analysis can include a process of examining relationships and connections between entities (such as IP addresses, domains, or individuals) to identify patterns of behavior and potential threats.

For example, aggregated information from authentication logs and information relating to known compromised account credentials sourced from threat intelligence and confirmed fraudulent transactions can be used to generate artificial accounts using robotic process automation or scripting. Login attempts to the generated artificial accounts can be logged with increased verbosity and additional metadata may be collected. The log data and metadata can be used to generate a profile (which may also be referred to as a fingerprint) using link analysis to identify other user accounts associated with log data and metadata corresponding to the same profile, which may indicate other potentially compromised accounts.

In one example, a system may receive an indication of a compromised user account. The system may receive information from open or closed source threat intelligence that includes details about compromised user accounts and credentials. The system can determine, from the information, compromised user accounts that are associated with users managed by a user identity provider included in the system. In this example, the system may identify a particular compromised user account.

The system can generate an artificial user account based on the particular compromised user account. For example, the system can send information about the compromised user account, including credentials like username and password, to a user identity provider included in the system. The user identity provider may cause an artificial account with the same artificial account username and artificial account password (or other credentials) as the compromised account username and compromised account password to be created. Once created, the artificial user account can be logged into using the same steps used to login to the compromised user account. From the standpoint of a user logging into the system, the compromised user account and the artificial user account result in the same user experience, such that no difference is noted during the login process. After login to the artificial account, the system can output an artificial user interface that mimics a typical user interface that is provided to external users such that that use of a security measure does not appear on the artificial user interface.

The system may detect a login to the artificial user account. Logins to the artificial user account may be limited to a subset of the functionality that is normally accessible to the application, or the system may provide access to synthetic versions of the application, such that actions accessible via the artificial user account are limited or otherwise prevented. Alternatively or additionally, the system can output notifications or save to authentication logs, information about the log-in to the artificial user account.

The system can receive information about one or more actions performed while logged into the artificial user account. For example, following a login to an artificial user account, the system may log actions taken with the artificial user account in authentication logs or to a suitable memory device, like a database or in-memory cache, based on artificial user account information. Similarly, the system can gather metadata relating to actions taken with the artificial user account. For example, if a login to an artificial user account is followed by an attempt to send a message, the details associated with the sending event may be recorded, along with information like the IP address associated with the login. In another example, one or more interactions with one or more user interface elements making up an artificial user interface, including related metadata, may be logged or recorded in a suitable filesystem or database.

The system may generate a profile associated with the artificial user account using the information about the one or more actions performed while logged into the artificial user account. The system can aggregate the information logged relating to the actions and the associated metadata, by, for example, performing statistical analysis on the information or by using a machine learning ("ML") model to generate a profile. For example, the generated profile may include information like IP address, user agent, device fingerprint information, language, and so on. The profile may include information that can be used to analyze actions following subsequent logins to other user accounts to determine if the actions correspond to the generated profile.

The system can use the profile to prevent a subsequent access to a user account that is associated with an identified profile that matches the profile. For example, following a subsequent login to particular user account, actions taken with the particular user account may be logged in authentication logs or to a suitable memory device. Similarly, the system can gather metadata relating to actions taken with the particular user account. As with the artificial user account, the system may generate a profile associated with the particular user account.

The profile associated with the artificial user account and the subsequent login to the particular user account may be compared. A sufficiently similar profile may be identified and may indicate that the login to the particular user account was a fraudulent login. Under these circumstances, the system can generate a notification automatically using email or other notification mechanism about the fraudulent login. Alternatively or in addition, the system can take automatic actions to prevent or mitigate harm due to the fraudulent login.

In some examples of the present disclosure, cybersecurity and fraud detection and prevention may be improved. Generating artificial user accounts based on compromised user account data obtained, for example, from open and closed source threat intelligence along with internally-obtained authentication data is a proactive security response strategy, which may mitigate or prevent damages before they occur. Similarly, such artificial user accounts can be used to gather intelligence to further mitigate or prevent damages. Moreover, the use of authentication data unique to the implementing organization may result in a strategy that is particularly tailored to the threats faced by the organization.

Additionally, some of the techniques of the present disclosure use the credentials of the compromised user accounts, which may improve the likelihood of detecting a password-based attack as compared with one that relies on, for example, random usernames or passwords. Moreover, some of the techniques are compatible with both internal user identity providers and external identity providers and may therefore detect or prevent fraud across a spectrum of authentication technologies and credential types. Thus, some techniques of the present disclosure may contribute to derisking of an organization by reducing the likelihood and impact of security incidents, thereby protecting the organization's reputation, assets, and customers.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a system 100 for detecting and preventing fraud using techniques for compromised user credential theft detection via artificial accounts, according to one aspect of the present disclosure. The system 100 may include an artificial account management server 102 running inside a datacenter 101. But the artificial account management server 102 may be external to the datacenter 101, for example, in a cloud computing instance.

The datacenter 101 may include physical servers, virtual server instances, gateways to cloud computing instances, or any combination thereof. In some examples, one or more components of system 100 may be executed or hosted by a cloud services provider. For example, the artificial account management server 102 may be implemented by one or more containers running in a cloud compute instance. The containers may be managed, for example, using a container orchestration server. Likewise, the cloud services may include one or more virtual servers. The virtual servers may also reside in the datacenter 101 or on artificial account management server 102, in concert with, for example, a virtualization technology like a hypervisor.

The artificial account management server 102 may be a component of a system for user authentication and authorization. For example, artificial account management server 102 may include an internal user identity provider 116, an external user identity provider 112, or both. A user identity providers may include technologies and protocols for authenticating to a service, server, or other host device using a centralized service. User identity providers typically support a range of authentication mechanisms, including username/password, social login, single sign on (SSO), among others. The supported mechanisms may utilize authentication protocols including, among others, Open Authorization ("OAuth"), OAuth2, OpenID Connect, or Security Assertion Markup Language ("SAML").

Generally, user identity providers may be classified as internal or external. An internal user identity provider may be used for managing user authentication and authorization within an organization's own network or applications. For example, internal user identity providers may be used for controlling access to enterprise applications such as email, file sharing, and customer relationship management ("CRM") systems that are used by employees and contractors of the organization. In some examples, internal user identity providers may be based on technologies such as Lightweight Directory Access Protocol ("LDAP") or Active Directory® to manage user accounts and credentials.

In contrast, external user identity providers may be used to provide authentication and authorization services for external-facing applications or services, such as e-commerce websites, social media platforms, or online banking systems. External user identity providers may be provided as third-party services, such as Auth0®, Okta®, or Ping®. In some examples, organizations may create and host custom an external user identity provider. For example, an external user identity provider created by an organization may reside on a server in the datacenter 101.

Internal user identity provider 116 may include an internal user database 118. For example, the internal user database 118 may be a tree structure that maps to the user accounts, groups, and resources of an organization. The internal user database 118 may also include user credential information that can be used for authentication to internal services and resources. For example, the internal user database 118 may include, among other things, usernames, passwords, domain names, security identifiers (SIDs), or Kerberos configuration information.

External user identity provider 112 is depicted outside the artificial account management server 102 and the datacenter 101. However, in some examples, the external user identity provider 112 may be hosted inside the datacenter 101 or artificial account management server 102, or in another configuration. The distinction between internal and external user identity providers is functional and does not necessarily relate to the architectural layout of the authentication system.

External user identity provider 112 may include external user database 114. For example, external user database 114 may be a relational database, including a hierarchical table structure for managing relationships between entities (e.g., users, groups, permissions, etc.). In some other examples, the external user database may use alternative technologies including document-based databases, graph databases, or key-value stores. In examples in which the external user identity provider 112 is hosted by a third-party, the external user database 114 may be abstracted and accessible through an application programming interface ("API"), such that the implementation details of the external user database 114 are not visible to the artificial account management server 102. For instance, the external user database 114 or the services provided by the external user identity provider 112 may be accessible through an API utilizing technologies like Representational State Transfer ("REST"), GraphQL, Remote Procedure Calls ("RPCs"), or the Simple Object Access Protocol ("SOAP"), among others.

The artificial account management server 102 may be a component of an authentication system providing services to user devices 104a, 104b, 105 connecting via network 108. The network 108 may be a public network, private network, or a hybrid network that combines elements of both public and private network. For example, network 108 may include a local area network ("LAN"), wide area network ("WAN"), metropolitan area network ("MAN"), wireless local area network ("WLAN"), storage area network ("SAN"), or virtual private network ("VPN"), as well as a combination of networks accessing the system 100 over the Internet.

User devices 104a, 104b, 105 may include client devices like laptops, desktops, smartphones, tablets, and the like. In FIG. 1, two legitimate user devices 104a, 104b are communicatively coupled to artificial account management server 102 via network 108. Legitimate user devices 104a, 104b are connected to system 100 for business, personal, entertainment, or other reasons relating to the services provided by system 100. User device 105 is a malicious user device. Malicious user device 105 may be operated by an actor intending to commit acts of fraud, theft, impersonation, etc. against the operator of system 100. In general, the system 100 can allow connections by legitimate user devices 104*a*, 104*b* and to deny connections by malicious user device 105. However, when a malicious user device 105 manages to connect, the innovations of the present disclosure are provided to detect such access, mitigate damages, and prevent such access in the future.

Artificial account management server 102 may include authentication engine 110. Upon verification of credentials by the external user identity provider 112 or internal user identity provider 116, an indication of the successful authentication may be sent to the authentication engine 110. For example, authentication engine 110 may create user sessions, set user roles and permissions, log the authentication, fetch and provide login notices to the authenticated user, or update a database to reflect the login, among other functions. Login can refer to the combined series of operations including at least verification of user credentials by a user identity provider and one or more operations by the authentication engine 110.

In some configurations, authentication and login operations may be logged by the authentication log provider 128. The authentication log provider 128 can receive information from the components of the internal user identity provider 116, external user identity provider 112, authentication engine 110, or other components, and log the information to authentication logs 130. For example, in one example embodiment, authentication engine 110 is a program code module. The program code module may include various named software components that can output information to authentication logs 130 with appropriate labeling for cross-indexing, debugging, and security auditing.

Authentication log provider 128 may have one or more log levels. The log level may correspond to the verbosity and detail of logging as authentication and login operations proceed. For example, a typical set of log levels may be, from most verbose to least verbose: trace, debug, info, warn, error, fatal, but different implementations of authentication log provider 128 may use different names or have a different number of log levels.

Log level can be configured with varying levels of granularity. For instance, the log level can be increased or decreased at the module, submodule, or other component level. Or log level can be increased or decreased for certain subject matter, like, for example, when certain users, groups, or resources are referenced. Authentication log provider 128 may operate with info log level by default, but can be varied manually or programmatically (i.e., automatically) according to specified configurations. For example, the system 100 may increase log level (e.g., increase the verbosity of logging) for any event relating to a particular user account for security auditing purposes.

Authentication log provider 128 may generate an indication of a suspicious login when a login attempt to the artificial user account is made. For example, the system 100 may access, from the authentication log provider 128, one or more user authentication logs 130 and identify the indication of the suspicious login in a user authentication log. This may include searching the user authentication logs 130 for the artificial account username, identifying additional context for the suspicious login near the artificial account username, and generating a message including at least the artificial account username and the additional context. The authentication log provider 128 may log the operations relating to user authentication and logins. The system may also periodically search the authentication logs for certain strings associated with known compromised user credentials that are the basis of an artificial account. Upon matching, the system may generate a notification or alert to cause a security response.

Log aggregator 132 monitors information logged in authentication logs 130 by the authentication log provider 128. Log aggregator 132 may copy or upload completed authentication logs 130 to an archived location where they can be indexed for search and retrieval. For example, because authentication logs 130 may grow rapidly on high-traffic systems, authentication logs 130 may be created and written to for a short period of time (e.g., 1 minute) before being archived and replaced, to minimize the generation of large log files and to facilitate rapid indexing and searching. Log aggregator 132 may provide summary statistics, reports, or notifications relating to manually created queries or generated automatically by, for example, artificial account management server 102 in response to the creation of an artificial account.

In some examples, log aggregator 132 can receive queries that are similar in form to structured query language ("SQL") queries. For instance, log aggregator queries may include a SELECT clause to identify the data or log field to return or a WHERE clause to filter information. However, variations on SQL may also be used, in addition to other mechanisms for querying aggregated log data.

Artificial account management server 102 may receive external security information for the purpose of identifying compromised user accounts. For example, artificial account management server 102 may receive closed source threat intelligence 120 and open source threat intelligence 122. Closed source threat intelligence 120 and open source threat intelligence 122 differ with respect to the sources of information they use and the accessibility of the data in those sources. Closed source threat intelligence 120 may refer to information that is collected from proprietary, subscription-based, or restricted-access sources. In contrast, open source threat intelligence 122 may refer to information that is gathered from publicly available sources, such as websites, blogs, forums, social media platforms, and so on. This type of intelligence is publicly accessible and can be collected and analyzed by both individuals and organizations. In some examples, both closed source threat intelligence 120 and open source threat intelligence 122 may obtained from third-party vendors or organizations. However, because the sources of information are generally public, open source threat intelligence 122 may also be gathered and collected by the operators of the system 100. In addition to closed source threat intelligence 120 and open source threat intelligence 122, information about compromised user accounts may be obtained from other sources, such as internal network monitoring, honeypots, "dark web" monitoring, information sharing and analysis centers ("ISACs"), government advisories, or industry partnerships.

For example, artificial account management server 102 may include an internal threat analysis 124 component. Internal threat analysis 124 may receive information from components such as authentication engine 110, log aggregator 132, or machine learning ("ML") model 106 to identify compromised user accounts. Internal threat analysis 124 may be performed manually or automatically. For example, the data from internal and external sources can be analyzed to identify patterns suggestive of malicious behavior. Likewise, internal threat analysis 124 may perform statistical analysis or other pattern recognition technique (e.g., regression analysis, cluster analysis, time series analysis, principal component analysis, etc.) on data from internal and external sources to automatically identify patterns suggestive of malicious behavior and to subsequently generate notifications to cause a security response upon detection. Such automatic notifications may also trigger the creation of an artificial account in accordance with some techniques of the present disclosure, as will be discussed below.

Artificial account management server 102 may include a ML model 106. The ML model 106 may be used for the identification of compromised user accounts based on internal and external data sources. For example, the ML model 106 may be trained using supervised or semi-supervised learning techniques including labeled training data that relates logged authentication data to known compromised user accounts. Then the trained ML model can be used to generate a probability or otherwise predict that a series of logged authentication operations correspond to a true compromised user account. Likewise, unsupervised techniques (e.g., clustering, dimensionality reduction, anomaly detection, density estimation, generative models, etc.) can be used to determine patterns in logged authentication operations and generate notifications, alerts, or predictions based on those patterns.

The techniques of the present disclosure are applicable to a variety of ML models used for prediction and classification given heterogenous data sets. For example, the ML model 106 may include one or more of the following types of ML models commonly used for classification and prediction: linear regression, logistic regression, decision tree, random forest, gradient boosting machine (GBM), extreme gradient boosting (XGBoost), support vector machine (SVM), naive bayes, k-nearest neighbor (KNN), principal component analysis (PCA), factorization machines (FM), autoencoder, convolutional neural network (CNN), recurrent neural network (RNN), long short-term memory (LSTM), generative adversarial network (GAN), deep belief network (DBN), multilayer perceptron (MLP), randomized search, Bayesian optimization, or a combination thereof. This list of applicable models is non-limiting and a person of ordinary skill in the art will recognize that the techniques of the present disclosure may be used with other ML models, approaches, and algorithms.

Artificial account management server 102 includes artificial account manager 126. Artificial account manager 126 may include components for managing user accounts at both internal user identity provider 116 and external user identity provider 112. Artificial account manager 126 thus manages artificial user account information that may be actually stored at another location. For example, artificial account manager 126 may create, query, update, or delete user account information at databases included in the user identity providers, or in another remote database. In some examples, artificial account manager 126 may include local storage or an in-memory cache for ephemeral storage for enhanced performance and minimization of redundant queries.

Creation of an artificial account based on known compromised account information is predicated on the notion that any attempt to login into the system 100 using a known compromised account is fraudulent or malicious. Upon receipt of information about compromised user accounts by artificial account management server 102, artificial account manager 126 may cause the creation of an artificial user account. For example, artificial account manager 126 may use an API provided by external user identity provider 112 to create an artificial user account. External user identity provider 112 may provide account management services via a web-based API using technologies such as REST, SOAP, GraphQL, or WebSocket. In some examples, integration with external user identity provider 112 may be achieved using program code such as published third-party code libraries, frameworks, and software development kits ("SDKs").

Upon the receipt of additional information, the artificial account manager 126 may cause further actions as needed to manage the artificial user account. For example, a compromised user account may have been determined to be compromised in error. For instance, internal threat analysis 124 may have made a determination that an account was compromised based on suspicious login behavior that may have been legitimate (e.g., a forgotten password or child with access to a keyboard). In such cases, the artificial account manager 126 may be manually or automatically caused to respond to certain events to update or delete artificial user accounts that have been created. For example, the original owner of a compromised user account may wish to reclaim their account. The artificial account manager 126 can be used to delete the artificial user account that was created and the external user identity provider 112 can be used to recreate their account.

Artificial account management server 102 includes a profile subsystem 134. Profile subsystem 134, in some implementations, includes components such as a profile generator 136, profile analyzer 138, and a profile database 140. The profile subsystem 134 is used, generally, for generating profiles for the artificial user accounts created using artificial account manager 126 based on information about actions performed while logins to the artificial user accounts have occurred. However, in some examples, profiles are generated for every user account in order to compare profiles for different types or categories of user. Profiles may be built on information obtained following login to a webpage or application using an artificial user account. For example, behavioral data that can be gathered, for example, using JavaScript APIs inside a web browser include browsing history, search history, download history, credential information, geolocation data, time spent on websites, mouse movements, keystroke patterns, referral source, website preferences/settings, or payment information. Likewise, non-behavioral data (e.g., system, browser, or configuration data) that can be gathered, for example, using JavaScript APIs inside a web browser include IP address, device type, browser type/version, cookies, operating system, installed applications, system configuration settings, screen resolution, or browser extensions/add-ons. One of ordinary skill in the art will recognize that these are merely examples of data that can be used for the development of security profiles. For instance, operating-system APIs may be available to gather data following login to native operating-system applications.

Profile generator 136 receives information about actions taken with user device 105 when logged into an artificial user account. Statistical methodologies or aggregations may be applied to the information to generate a profile. For example, the profile may include information about the user agent of user device 105, location, the user device 105 itself, IP address, and so on. The profile may include trend analysis relating to the behavior of the user device 105. For example, the profile may include an indication of which actions the user device 105 is most likely to perform or which webpages user device 105 is most likely to access. ML model 106 can be used, in some examples, to apply unsupervised learning models (e.g., a clustering algorithm) to the user data to recognize patterns and generate the profile therefrom.

Generated profiles may be stored in profile database 140. Profile database 140 may be a relational database, document-based database, graph database, or key-value store, including an in-memory key-value store for ephemeral profile storage and fast access. Profile database 140 may provide for profile creation, querying, updating, and deleting by the components of the artificial account management server 102. For example, profile database 140 may provide an API accessible by profile analyzer 138.

Profile analyzer 138 can query profile database 140 in response to indications from the artificial account manager 126. For example, upon creation of a new artificial user account, profile analyzer 138 may periodically query profile database 140 for the generated (or updated) profile associated with the artificial user account. The profile analyzer 138 may also query the profile database 140 for similar profiles, iterate through existing profiles, or according to another suitable algorithm for selecting profiles for comparison. For example, if the profile associated with an artificial user account includes a particular private IP address, the profile analyzer 138 may query the profile database 140 for all profiles with the same IP address.

The profile analyzer 138 may use link analysis to make a determination of the likelihood that any two given profiles correspond to the same login. Link analysis may include techniques for analyzing the relationships and connections between entities or events, such as users, devices, or network traffic. For example, link analysis may be used to determine a relationship between two profiles having the same IP address. In another example, link analysis may be used to identify profiles corresponding to common devices by determining a relationship based on similar device characteristics such as the same operating system version, device type, and installed applications.

In some examples, the profile analyzer 138 use mathematical or statistical methods such as regression analysis to compare profiles and determine the likelihood that any two given profiles correspond to the same login. For example, the mathematical methods may employ a similarity measure such as Levenshtein distance or cosine similarity. In another example, profile analyzer 138 may use statistical methods to compare the profile associated with an artificial user account to another profile and predict with a 75% confidence level that the two profiles correspond to the same login. In some examples, the profile analyzer 138 may use ML model 106 to make predictions about profiles. For example, one example ML model can be adversarially trained to classify profile pairs as matching or not matching. Other ML model configurations may be used for profile comparison, such as decision trees, random forests, and so on.

Although certain components are shown in FIG. 1, other suitable, compatible, network hardware components and network architecture designs may be implemented in various embodiments to support communication between the artificial account management server 102 and the user devices 104a, 104b, 105 via network 108. Such communication network(s) may be any type of network that can support data communications using any of a variety of commercially available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the artificial account management server 102 and user device 104a in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
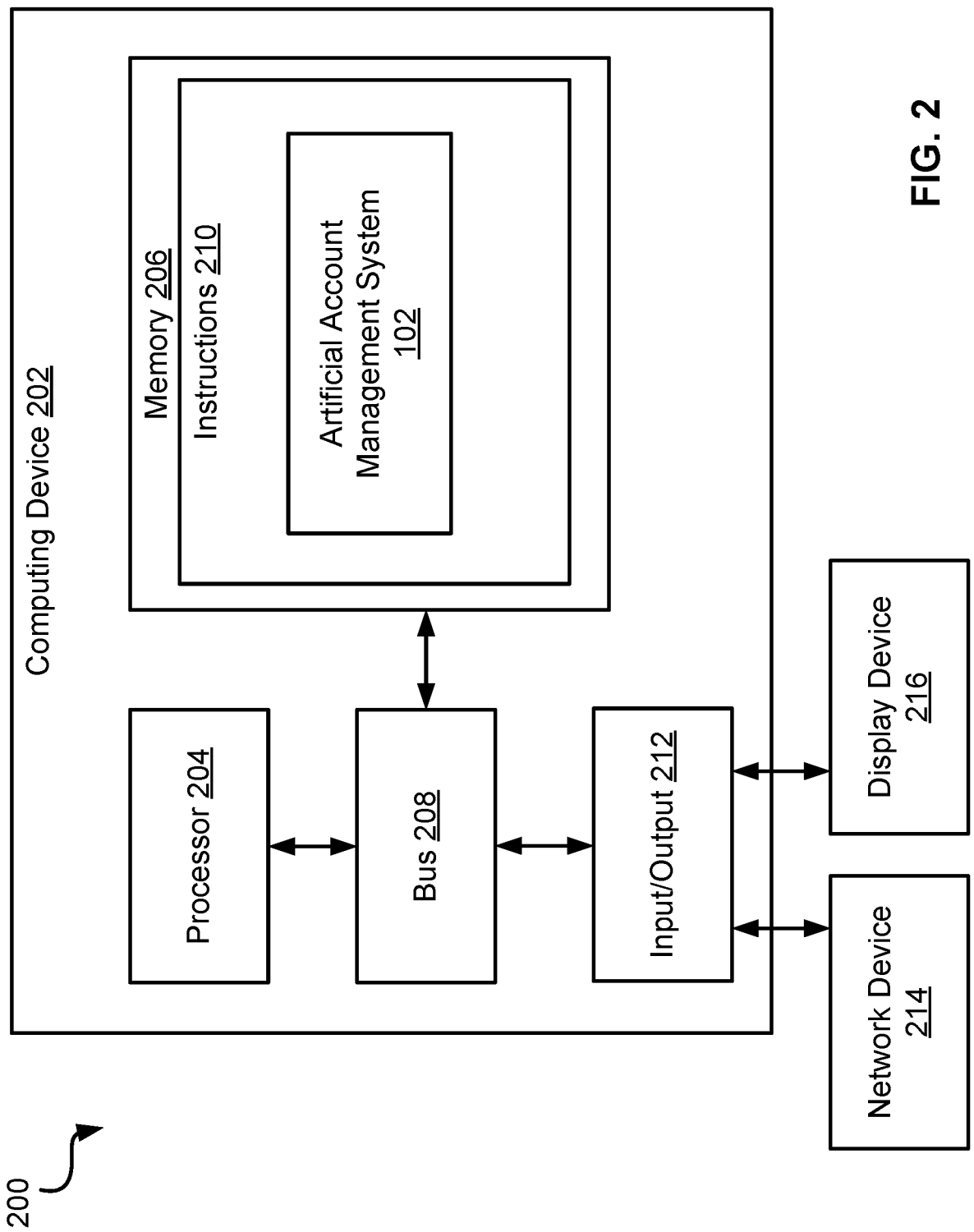
FIG. 2 is a block diagram of an example of a system for detecting and preventing fraud using techniques for compromised user credential theft detection via artificial accounts, according to one aspect of the present disclosure.

FIG. 2 is a block diagram of an example of a system 200 for detecting and preventing fraud using techniques for compromised user credential theft detection via artificial accounts according to one aspect of the present disclosure. The system 200 may correspond to the artificial account management server 102 or any other component included in the system 100. A computing device 202 can include a processing device 204, a memory 206, a bus 208, and an input/output 212. A display device 216 and network device 214 can be connected to the input/output 212. In some examples, the components shown in FIG. 2 may be integrated into a single structure. For example, the components can be within a single housing. In other examples, the components shown in FIG. 2 can be distributed (e.g., in separate housings) and in electrical communication with each other.

The processing device 204 may execute one or more operations for implementing various examples and embodiments described herein. The processing device 204 can execute instructions 210 stored in the memory 206 to perform the operations. The processing device 204 can include one processing device or multiple processing devices. Non-limiting examples of the processing device 204 include a Field-Programmable Gate Array ("FPGA"), an application-specific integrated circuit ("ASIC"), a microprocessor, etc.

The processing device 204 may be communicatively coupled to the memory 206 via the bus 208. The memory 206 may include any type of memory device that retains stored information when powered off. Non-limiting examples of the memory 206 include electrically erasable and programmable read-only memory ("EEPROM"), flash memory, or any other type of non-volatile memory. In some examples, at least some of the memory 206 may include a medium from which the processing device 204 can read instructions 210. A non-transitory computer-readable medium storing instructions may include electronic, optical, magnetic, or other storage devices capable of providing the processing device 204 with computer-readable instructions or other program code. Non-limiting examples of non-transitory computer-readable media storing instructions include (but are not limited to) magnetic disk(s), memory chip(s), ROM, random-access memory ("RAM"), an ASIC, a configured processor, optical storage, or any other medium from which a computer processor may read instructions 210. The instructions 210 may include processor-specific instructions generated by a compiler or an interpreter from code written in any suitable computer-programming language, including, for example, C, C++, C#, etc.

The input/output 212 may interface other network devices or network-capable devices to communicatively couple, for example, external user identity provider 112 to system 100. Information received from the input/output may be sent to the memory 206 via the bus 208. The memory 206 can store any information received from the input/output 212.

The memory 206 may include instructions 210 for operating one or more components of the artificial account management server 102. For example, the instructions may include program code for the operation of the artificial account manager 126, authentication engine 110, log aggregator 132, or other component. In some examples, the instructions may be organized into modular units or namespaces, each containing related functions and data. In some cases, program code and functionality may be consolidated into a single or small number of modules.

Figure 3:
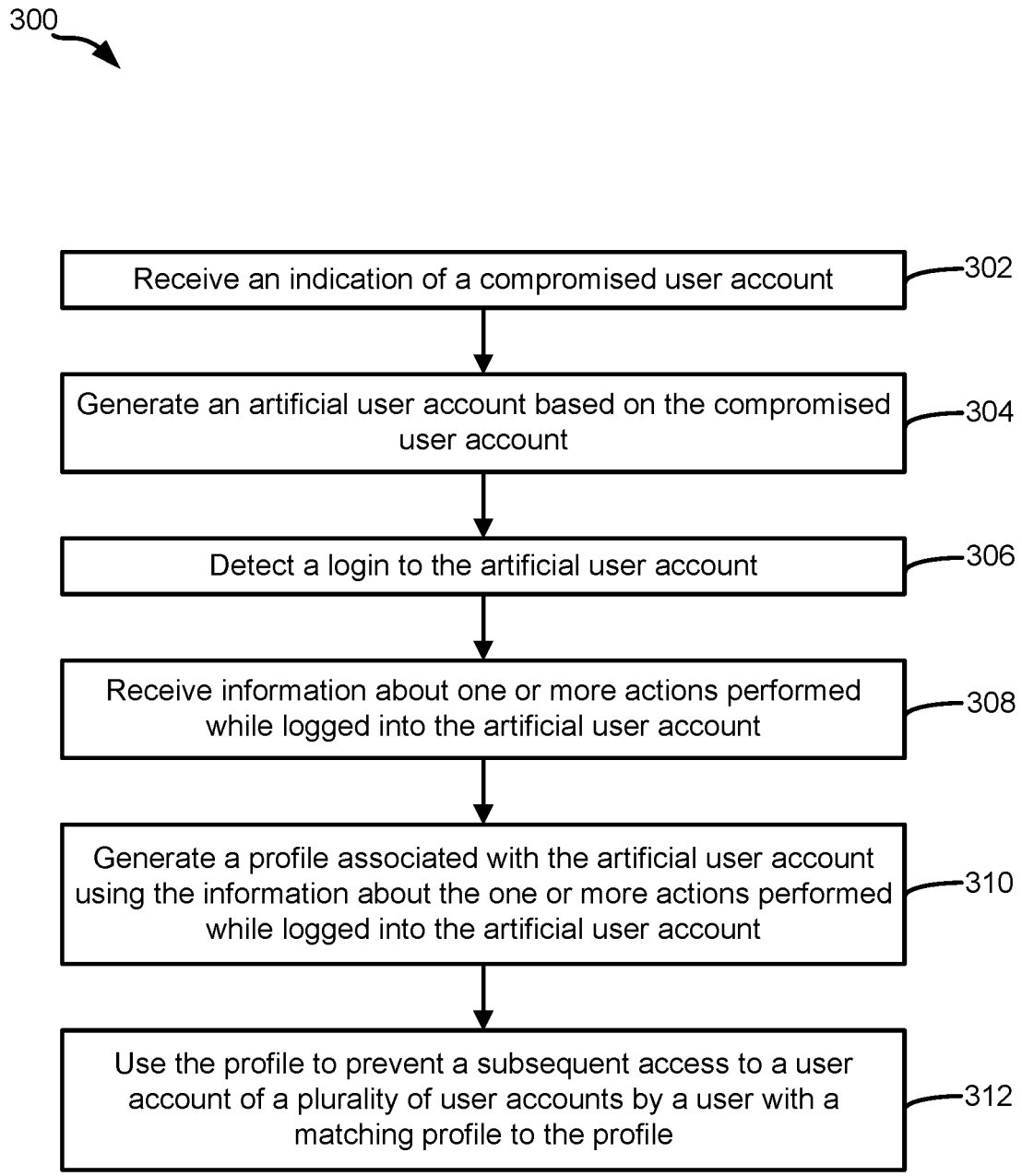
FIG. 3 is a flowchart of a process for detecting and preventing fraud using techniques for compromised user credential theft detection via artificial accounts, according to one aspect of the present disclosure.

FIG. 3 depicts a flowchart of a process 300 for detecting and preventing fraud using techniques for compromised user credential theft detection via artificial accounts according to one aspect of the present disclosure. In some examples, the processing device 204 can implement some or all of the blocks shown in FIG. 3. The processing device 204 can implement some or all blocks according to program code received from other components, for example, from the artificial account management server 102. Other example variations can include more blocks, fewer blocks, different blocks, or a different order of the blocks than is shown in FIG. 3. The blocks of FIG. 3 are discussed below with reference to the components discussed above in relation to FIGS. 1 and 2.

At block 302, the processing device 204 can receive an indication of a compromised user account. For example, the indication may include information sent (e.g., uploaded) to the system 100 from closed source threat intelligence 120 or open source threat intelligence 122 sources. Likewise, internal threat analysis 124 may determine that a compromised account exists and generate an indication like a notification, alert, or event. In some examples, the artificial account management server 102 may perform the remaining operations of process 300 based on receiving the indication. For example, as closed source threat intelligence 120 or open source threat intelligence 122 are updated externally, they may send new data to the system 100, which may cause new artificial accounts to be created automatically. Because cyberattacks against targets using compromised credentials may take place quickly after compromise, configuring the system 100 to react quickly upon receipt of new compromised user account information may result improved security.

In block 304, the processing device 204 may generate an artificial user account based on the compromised user account. For example, the artificial account manager 126 may send a command to cause the external user identity provider 112 to create a new external account with credentials based on the compromised user account. The command may include instructions to generate an artificial account with the same artificial account username, artificial account password, artificial account personal identification number (PIN), artificial account two-factor authentication methods, and so on, as the compromised account username, compromised account password, compromised account personal identification number (PIN), compromised account two-factor authentication method, respectively. The artificial account manager 126 may make the login process to the artificial user account identical to the process for the compromised user account, such that an attacker cannot tell the difference.

In block 306, the processing device 204 may detect a login to the artificial user account. For example, the external user identity provider 112 can generate notifications or alerts about logins to the artificial user account. However, in some examples, the external user identity provider is controlled by a third party and may have limited configurations and capabilities. For instance, some external user identity providers may lack the capability to generate notifications or alerts about logins to certain accounts. Under these circumstances, the authentication log provider 128 may log authentication and login details relating to the artificial user account. The log aggregator 132 can query the authentication logs 130 to identify operations relating to the artificial user account. Additionally, other components in the system 100 may be detect and act on artificial user account logins. For example, authentication engine 110 may include program code for generation of notifications or alerts when one on a list or array of artificial account usernames is detected.

In block 308, the processing device 204 may receive information about one or more actions performed while logged into the artificial user account. For example, the log aggregator 132, upon querying the authentication logs 130 for operations relating to the artificial user account, may receive information about actions performed while logged into the artificial user account. The information may include one or more interactions with one or more user interface elements. The information may include events and actions such as login attempts, multi-factor authentication attempts, password resets, account lockouts, user profile/configuration changes, changes to roles/permissions, token issuance/revocation, policy changes, suspicious activity, or logout events, among others. In addition to authentication-related actions, the system 100 may log events or actions related to potentially damaging operations like file access, command execution, network activity, privilege escalation, directory traversal, system configuration changes, data encryption/decryption, or critical application functions. Actions may be domain-specific. For example, if they system 100 is used in the banking sector, the system 100 may log actions related to financial crimes like withdrawals, transfers, securities trades, and so on. In addition to log data, information may be received from other components including, for example, the authentication engine, the external user identity provider, among others. Received information may be in the form of log data, pointers or references to data structures, streams, events/callbacks, message queues, shared memory, or sockets, among others.

In block 310, the processing device 204 may generate a profile associated with the artificial user account using the information about the one or more actions performed while logged into the artificial user account. For example, the system 100 may include a profile generator 136. The profile generator 136 may receive the information received in block 308 to generate a profile. In the event the profile already exists, the profile generator 136 may update an existing profile. The profile generator 136 may aggregate the information and assemble the profile in a format suitable for analysis and comparison by the profile analyzer 138 using, for example, link analysis. For example, profiles may be generated and stored in a suitable data structure for machine processing like JavaScript Object Notation ("JSON") or the extensible markup language ("XML"). Generated profiles may be stored in profile database 140.

In block 312, the processing device 204 may use the profile to prevent a subsequent access to a user account of a plurality of user accounts based on another profile that matches the profile. For example, the profile analyzer 138 can receive profiles generated by the profile generator 136 use a similarity measure, mathematical or statistical method, or predictions from an ML model 106 to establish a similarly between two profiles. The profile associated with the artificial user account can be compared with profiles associated with other user accounts and a security response may be caused, using suitable notifications and alerts, when a match is detected. For example, profile analyzer 138 may generate suitable notifications, messages, or alerts when a profile associated with a login to a particular user account matches that of the artificial user account based on a threshold level of similarity. For instance, a threshold similarity of 90% can be established, according to empirical measures of efficacy.

When a match is determined, the system may take certain automatic actions or manual intervention may be caused through suitable notifications or alerts. For instance, the affected user account can be disabled. In some examples, an artificial environment may be created to mimic the real system environment that is provided to external users to allow the suspicious login to proceed with increased monitoring and minimal or no damages possible. The artificial environment may include artificial UI elements like an artificial account number or artificial account numbers, an artificial account balance or artificial account balances, and artificial controls, such as artificial transfer controls. Such an artificial environment may be used to gather intelligence or delay the attacker. In some examples, the suspicious login can be reported to law enforcement who may then intervene on behalf of the reporting organization. One of ordinary skill in the art will recognize that a variety of responses are possible in the cybersecurity context, and that only several examples are given here.

For example, a functional copy of an e-commerce website may be created that logins to artificial user accounts are directed to. Logins to the artificial user accounts can then be closely monitored and controlled. For instance, the artificial user interface elements of the functional copy may include such elements as an artificial account number or artificial account numbers, an artificial account balance or artificial account balances, or artificial controls (e.g., artificial transfer control) such that the artificial user interface contains no indication that a security measure has been activated.

Figure 4:
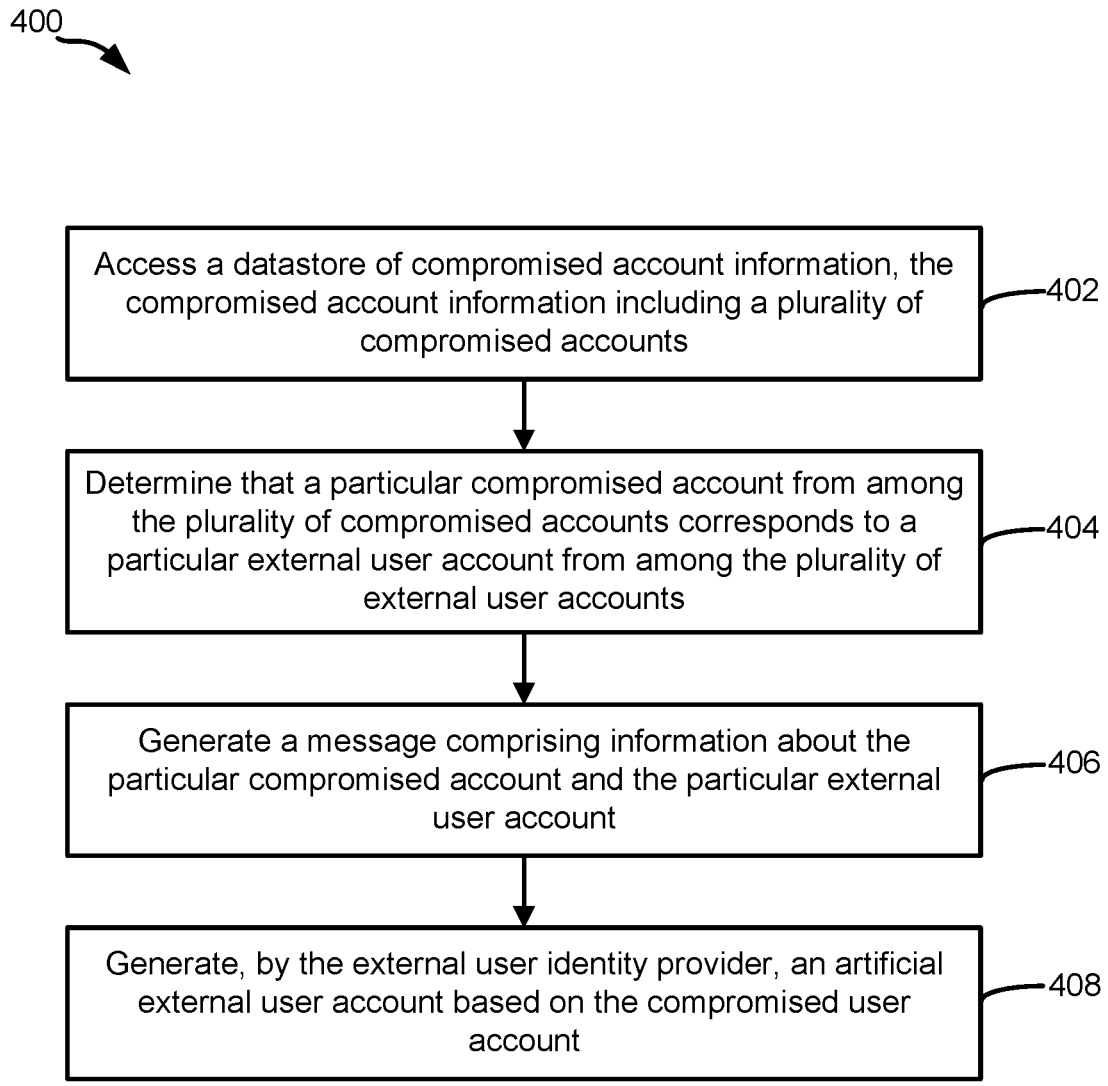
FIG. 4 is a flowchart of a process for detecting and preventing fraud using techniques for compromised user credential theft detection via artificial accounts according to one aspect of the present disclosure.

FIG. 4 depicts a flowchart of a process 400 for detecting and preventing fraud using techniques for compromised user credential theft detection via artificial accounts according to one aspect of the present disclosure. In some examples, the processing device 204 can implement some or all of the blocks shown in FIG. 4. The processing device 204 can implement some or all blocks according to program code received from other components, for example, from the artificial account management server 102. Other example variations can include more blocks, fewer blocks, different blocks, or a different order of the blocks than is shown in FIG. 4. The blocks of FIG. 4 are discussed below with reference to the components discussed above in relation to FIGS. 1 and 2.

At block 402, the processing device 204 can access a datastore of compromised account information, the compromised account information including a plurality of compromised accounts. For example, the datastore may include closed source threat intelligence 120, open source threat intelligence 122, or a combination of both. The datastore may also include information generated or inferred by the internal threat analysis 124 component. The datastore may include other sources of compromised user accounts including, for example, public data breaches, information about stolen user devices, unsecured servers, supply chain attacks, or weak passwords. The datastore may include sufficient information to create an artificial account using the information. For example, at a minimum, the datastore should contain the credentials (e.g., username, password, multi-factor authentication information, etc.) of the compromised account such that the artificial account login experience can precisely mimic the experience that would be had logging into the compromised user account.

In block 404, the processing device 204 may determine that a particular compromised account from among the plurality of compromised accounts corresponds to a particular external user account from among the plurality of external user accounts. Compromised user accounts found in external user database 114 may be of significant interest, because they may be the most likely targets of credential stuffing attacks. For example, a list of compromised user accounts derived from 402 may be iterated over and sequentially compared with a similar list generated by the external user identity provider 112. Similarly, the external user database 114 may be iteratively queried. The inverse process may be used in some embodiments: a list of external user accounts provided by the external user identity provider 112 may be iterated over and used to search the information received from the datastore in 402. For example, the information received from the datastore may be added to a database or in-memory cache, or otherwise indexed, such that it can be quickly and easily searched as new information becomes available in real-time.

In block 406, the processing device 204 may generate a message comprising information about the particular compromised user account and the particular external user account. For example, upon identification of a compromised user account/external user account pair, the artificial account manager 126 may create a data structure containing information about the compromised user account. The data structure may include metadata about the compromised user account, the external user account, and the credentials of the compromised user account. The data structure may contain sufficient information for the generation of an artificial user account.

In block 408, the processing device 204 may generate, by the external user identity provider, an artificial external user account based on the compromised user account. For example, the external user identity provider 112 may receive from the artificial account manager 126 the data structure generated at 406, along with instructions to generate an artificial user account. The instructions may include a call to a method or function of the external user identity provider 112 via an API that corresponds to creation of a user account. In some examples, the creation of an artificial user account is followed by disablement of the external user account. In some other examples, the creation of an artificial user account is followed by generation of a notification to the owner of the external user account indicating that the external user account is disabled due to a security incident. The notification may be accompanied by creation of a new user account according to the security procedures established by the organization administrating the system 100.

Figure 5:
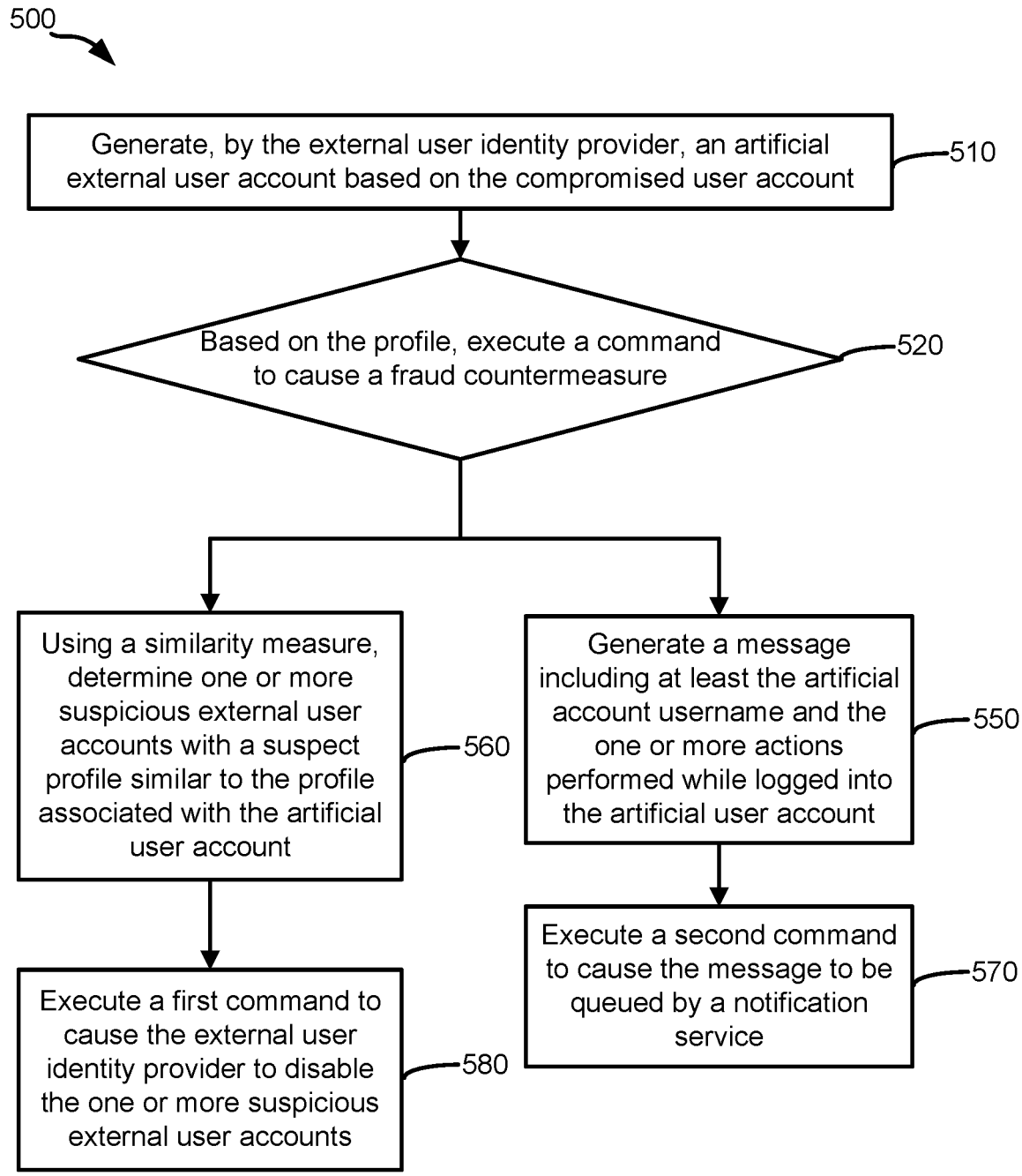
FIG. 5 is a flowchart of a process for detecting and preventing fraud using techniques for compromised user credential theft detection via artificial accounts, according to one aspect of the present disclosure.

FIG. 5 depicts a flowchart of a process 500 for detecting and preventing fraud using techniques for compromised user credential theft detection via artificial accounts according to one aspect of the present disclosure. In some examples, the processing device 204 can implement some or all of the blocks shown in FIG. 5. The processing device 204 can implement some or all blocks according to program code received from other components, for example, from the artificial account management server 102. Other example variations can include more blocks, fewer blocks, different blocks, or a different order of the blocks than is shown in FIG. 5. The blocks of FIG. 5 are discussed below with reference to the components discussed above in relation to FIGS. 1 and 2.

At block 510, the processing device 204 can generate, by the external user identity provider 112, an artificial external user account based on the compromised user account. For example, the external user identity provider 112 may receive instructions to generate an artificial user account based on open or closed source threat intelligence as described in FIG. 4 and the accompanying description.

In block 520, based on the profile associated with the artificial user account, the processing device 204 may execute a command to cause a fraud countermeasure. A fraud countermeasure can be an automatic or manual response taken by the system 100 based on detecting fraud. The system 100 may select an appropriate response based on the context of the security incident. Two examples of fraud countermeasures are depicted in process 500 and are described in detail below. But a variety of fraud countermeasures are possible in response to a detected fraudulent login.

In the first fraud countermeasure example, the artificial account management server 102 may prevent external user logins by external users with external user profiles similar to the profile associated with the artificial user account. For example, at block 560, the processing device 204 may, using a similarity measure, determine one or more suspicious external user accounts with a suspect profile similar to the profile associated with the artificial user account. For example, profile analyzer 138 may iterate over profiles associated with artificial user accounts and calculate a similarity measure with the profiles associated with other user accounts. Similarity measures such as cosine similarity, Euclidean distance, or Levenshtein distance may be used. A suspect profile may be one that exceeds a pre-determined value of the similarity measure. For example, the cosine similarity is a numerical measurement of the similarity between two non-zero vectors. A threshold value of 0.75, for example, may be chosen as the definition of a suspect profile, based on empirical observations or testing.

At block 580, the processing device 204 may execute a first command to cause the external user identity provider to disable the one or more suspicious external user accounts. For example, upon identification of one or more suspicious external user accounts, the system 100 may automatically or manually disable the one or more suspicious external user accounts to prevent damaging fraudulent activity that may be possible using those accounts. In some examples, the disablement may be followed by suitable notifications, messages, or alerts of the disabled suspect accounts.

In the second fraud countermeasure example, the artificial account management server 102 may generate a notification of the login to the artificial user account. For example, at block 550, the processing device 204 may generate a message including at least the artificial account username and the one or more actions performed while logged into the artificial user account. The message can be dispatched to a suitable component for causing a pre-configured response to the artificial account login.

At block 570, the processing device 204 may execute a second command to cause the message to be queued by a notification service. In response to the notification, the system 100 may response automatically or manually to the detected login. For example, the artificial account may mimic the legitimate external user account. In some examples, the mimicking account may be referred to as a honeypot or honeypot account. The honeypot may be used to detect and analyze network attacks, monitor attacker tactics and techniques, gather threat intelligence, and divert attacker attention from critical systems, among other functions. In addition to these techniques for improving security, the system 100 may directly respond to the attacker by, for example, deceiving attackers with false information, simulating vulnerable systems or services, delaying the attacker, or waste attackers' time and resources. In another example, the notification may trigger alerts to law enforcement.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
one or more processors;
and one or more computer-readable storage media for storing instructions that are executable by the one or more processors to cause the system to perform operations including:
receiving an indication of a compromised user account;
generating an artificial user account based on the compromised user account;
detecting a login to the artificial user account, wherein the artificial user account has the same username, password, and two-factor authentication method as the compromised user account;
receiving information about one or more actions performed while logged into the artificial user account, wherein the information includes one or more interactions with one or more user interface elements including at least one of a login attempt, a multi-factor authentication attempt, a password reset, an account configuration change, or logout event;
generating a profile associated with the artificial user account using the information about the one or more actions performed while logged into the artificial user account;
using the profile to prevent access to a particular user account that is associated with a subsequent access attempt and an identified profile that matches the profile based on a first similarity measure between the profile and the identified profile;
responsive to determining that the identified profile matches the profile, disabling the particular user account; and
outputting a notification including information about the particular user account, the subsequent access attempt, and the identified profile.

2. The system of claim 1, wherein:
the compromised user account is an external user account managed by an external user identity provider having a plurality of external user accounts; and
the operation of receiving the indication of the compromised user account comprises the operations of:
accessing a datastore of compromised account information, the compromised account information including a plurality of compromised accounts;
determining that a particular compromised account from among the plurality of compromised accounts corresponds to a particular external user account from among the plurality of external user accounts; and generating a message comprising information about the particular compromised account and the particular external user account.

3. The system of claim 2, wherein:
the compromised user account comprises at least at least a compromised account username and a compromised account password; and
the operation of generating the artificial user account based on the compromised user account comprises the operations of:
  using the compromised user account, determining artificial user account information including at least an artificial account username, an artificial account password, and an artificial account two-factor authentication method;
  providing, to the external user identity provider, the artificial user account information; and
  receiving, from the external user identity provider, information indicating that the artificial user account has been generated.

4. The system of claim 1, wherein the profile associated with the artificial user account is a first profile, wherein the operations further comprise:
detecting a login to a legitimate user account;
receiving information about one or more actions performed while logged into the legitimate user account;
generating a second profile associated with the legitimate user account using the information about the one or more actions performed while logged into the legitimate user account; and
using the first profile and the second profile, determining a likelihood that a user associated with the first profile is also the user associated with the second profile.

5. The system of claim 4, wherein the operation of determining the likelihood that the user associated with the first profile is also the user associated with the second profile comprises the operations of:
comparing a first element from the first profile to a second element from the second profile by performing a link analysis;
based on the link analysis, determining a relationship between the first element and the second element; and
based on the relationship between the first element and the second element, generating the likelihood that the user associated with the first profile is also the user associated with the second profile.

6. The system of claim 1, wherein:
the artificial user account includes at least an artificial account username, an artificial account password, and an artificial account two-factor authentication method; and
the operation of detecting the login to the artificial user account comprises the operations of:
  configuring an authentication log provider to generate an indication of a suspicious login when a login attempt to the artificial user account is made;
  accessing, from the authentication log provider, one or more user authentication logs; and
  identifying the indication of the suspicious login in a user authentication log, comprising the operations of:
    searching the user authentication log for the artificial account username;
    identifying additional context for the suspicious login near the artificial account username; and
    generating a message including at least the artificial account username and the additional context.

7. The system of claim 1, wherein the user interface elements are included in an artificial user interface, wherein the artificial user interface is configured to mimic a user interface provided to external users.

8. The system of claim 7, wherein the one or more user interface elements of the artificial user interface comprise at least one of an artificial account number, an artificial account balance, or an artificial transfer control.

9. The system of claim 1, wherein:
the artificial user account comprises at least an artificial account username, an artificial account password, and an artificial account two-factor authentication method, and wherein the operations further comprise:
  based on the profile associated with the artificial user account, executing a command to cause a fraud countermeasure that includes at least one of:
    preventing external user logins by external users with external user profiles similar to the profile associated with the artificial user account by using a second similarity measure, determine one or more suspicious external user accounts with a suspect profile similar to the profile associated with the artificial user account and executing a first command to cause an external user identity provider to disable the one or more suspicious external user accounts; or
    generating a notification of the login to the artificial user account by generating a message including at least the artificial account username and the one or more actions performed while logged into the artificial user account and executing a second command to cause the message to be queued by a notification service.

10. A computer-implemented method comprising:
receiving an indication of a compromised user account;
generating an artificial user account based on the compromised user account;
detecting a login to the artificial user account, wherein the artificial user account has the same username, password, and two-factor authentication method as the compromised user account;
receiving information about one or more actions performed while logged into the artificial user account, wherein the information includes one or more interactions with one or more user interface elements including at least one of a login attempt, a multi-factor authentication attempt, a password reset, an account configuration change, or logout event;
generating a profile associated with the artificial user account using the information about the one or more actions;
using the profile to prevent access to a particular user account that is associated with a subsequent access attempt and an identified profile that matches the profile based on a first similarity measure between the profile and the identified profile; and
responsive to determining that the identified profile matches the profile, disabling the particular user account; and
outputting a notification including information about the particular user account, the subsequent access attempt, and the identified profile.

11. The method of claim 10, wherein:
the compromised user account is an external user account managed by an external user identity provider having a plurality of external user accounts; and receiving the indication of the compromised user account comprises:
  accessing a datastore of compromised account information, the compromised account information including a plurality of compromised accounts;
  determining that a particular compromised account from among the plurality of compromised accounts corresponds to a particular external user account from among the plurality of external user accounts; and
  generating a message comprising information about the particular compromised account and the particular external user account.

12. The method of claim 10, wherein the profile associated with the artificial user account is a first profile, further comprising:
  detecting a login to a legitimate user account;
  receiving information about one or more actions performed while logged into the legitimate user account;
  generating a second profile associated with the legitimate user account using the information about the one or more actions performed while logged into the legitimate user account; and
  using the first profile and the second profile, determining a likelihood that a user associated with the first profile is also the user associated with the second profile.

13. The method of claim 10, wherein:
  the artificial user account includes at least an artificial account username, an artificial account password, and an artificial account two-factor authentication method; and
  detecting the login to the artificial user account comprises:
    configuring an authentication log provider to generate an indication of a suspicious login when a login attempt to the artificial user account is made;
    accessing, from the authentication log provider, one or more user authentication logs; and
    identifying the indication of the suspicious login in a user authentication log, comprising:
      searching the user authentication log for the artificial account username;
      identifying additional context for the suspicious login near the artificial account username; and
      generating a message including at least the artificial account username and the additional context.

14. The method of claim 10, wherein:
  the user interface elements are included in an artificial user interface, wherein the artificial user interface is configured to mimic a user interface provided to external users.

15. The method of claim 10, wherein:
  the artificial user account comprises at least an artificial account username, an artificial account password, and an artificial account two-factor authentication method, and further comprising:
    based on the profile associated with the artificial user account, executing a command to cause a fraud countermeasure, wherein the fraud countermeasure comprises at least one of:
      preventing external user logins by external users with external user profiles similar to the profile associated with the artificial user account by using a second similarity measure, determine one or more suspicious external user accounts with a suspect profile similar to the profile associated with the artificial user account and executing a first command to cause an external user identity provider to disable the one or more suspicious external user accounts; or
      generating a notification of the login to the artificial user account by generating a message including at least the artificial account username and the one or more actions performed while logged into the artificial user account and executing a second command to cause the message to be queued by a notification service.

16. A non-transitory computer-readable medium storing instructions that, when executed by one or more processors, cause the one or more processors to perform operations including:
  receiving an indication of a compromised user account;
  generating an artificial user account based on the compromised user account;
  detecting a login to the artificial user account, wherein the artificial user account has the same username, password, and two-factor authentication method as the compromised user account;
  receiving information about one or more actions performed while logged into the artificial user account, wherein the information includes one or more interactions with one or more user interface elements including at least one of a login attempt, a multi-factor authentication attempt, a password reset, an account configuration change, or logout event;
  generating a profile associated with the artificial user account using the information about the one or more actions performed while logged into the artificial user account;
  using the profile to prevent access to a particular user account that is associated with a subsequent access attempt and an identified profile that matches the profile based on a first similarity measure between the profile and the identified profile;
  responsive to determining that the identified profile matches the profile, disabling the particular user account; and
  outputting a notification including information about the particular user account, the subsequent access attempt, and the identified profile.

17. The non-transitory computer-readable medium of claim 16, wherein:
  the compromised user account is an external user account managed by an external user identity provider having a plurality of external user accounts; and
  receiving the indication of the compromised user account comprises the operations:
    accessing a datastore of compromised account information, the compromised account information including a plurality of compromised accounts;
    determining that a particular compromised account from among the plurality of compromised accounts corresponds to a particular external user account from among the plurality of external user accounts; and
    generating a message comprising information about the particular compromised account and the particular external user account.

18. The non-transitory computer-readable medium of claim 16, wherein the profile associated with the artificial user account is a first profile, further comprising the operations:
  detecting a login to a legitimate user account;
  receiving information about one or more actions performed while logged into the legitimate user account;

generating a second profile associated with the legitimate user account using the information about the one or more actions performed while logged into the legitimate user account; and using the first profile and the second profile, determining a likelihood that a user associated with the first profile is also the user associated with the second profile.

19. The non-transitory computer-readable medium of claim 16, wherein:

the artificial user account includes at least an artificial account username, an artificial account password, and an artificial account two-factor authentication method; and the operation detecting the login to the artificial user account comprises the operations of:

configuring an authentication log provider to generate an indication of a suspicious login when a login attempt to the artificial user account is made;

accessing, from the authentication log provider, one or more user authentication logs; and identifying the indication of the suspicious login in a user authentication log, comprising the operations:

searching the user authentication log for the artificial account username;

identifying additional context for the suspicious login near the artificial account username; and generating a message including at least the artificial account username and the additional context.

20. The non-transitory computer-readable medium of claim 16, wherein:

the artificial user account comprises at least an artificial account username, an artificial account password, and an artificial account two-factor authentication method, and further comprising the operations:

based on the profile associated with the artificial user account, execute a command to cause a fraud countermeasure, wherein the fraud countermeasure comprises at least one of the operations including:

preventing external user logins by external users with external user profiles similar to the profile associated with the artificial user account by using a second similarity measure, determine one or more suspicious external user accounts with a suspect profile similar to the profile associated with the artificial user account and executing a first command to cause an external user identity provider to disable the one or more suspicious external user accounts; or generating a notification of the login to the artificial user account by generating a message including at least the artificial account username and the one or more actions performed while logged into the artificial user account and executing a second command to cause the message to be queued by a notification service.

* * * * *